United States Patent
Rich, Jr.

(10) Patent No.: US 6,711,903 B1
(45) Date of Patent: Mar. 30, 2004

(54) INTEGRATED ELECTRIC POWER AND SYNTHETIC FUEL PLANT

(76) Inventor: John W. Rich, Jr., R.D. #1, Box 211, Auburn, PA (US) 17922

( * ) Notice: Subject to any disclaimer, the term of this patent is extended or adjusted under 35 U.S.C. 154(b) by 0 days.

(21) Appl. No.: 10/369,024

(22) Filed: Feb. 19, 2003

Related U.S. Application Data

(60) Provisional application No. 60/361,200, filed on Mar. 1, 2002.

(51) Int. Cl.[7] .................................................. F02B 43/08
(52) U.S. Cl. ............................ 60/781; 60/648; 60/649; 60/652; 60/657
(58) Field of Search ........................ 60/670, 682, 652, 60/657, 645, 781, 648, 649

(56) References Cited

U.S. PATENT DOCUMENTS

| | | |
|---|---|---|
| 3,986,349 A | 10/1976 | Egan .......................... 60/781 |
| 4,364,822 A | 12/1982 | Rich, Jr. ........................ 209/3 |
| 4,795,037 A | 1/1989 | Rich, Jr. ........................ 209/3 |
| 6,015,104 A | 1/2000 | Rich, Jr. ...................... 241/20 |
| 6,170,770 B1 | 1/2001 | Rich, Jr. ...................... 241/81 |
| 6,306,917 B1 | 10/2001 | Bohn et al. ................ 518/700 |

*Primary Examiner*—Sheldon J. Richter
(74) *Attorney, Agent, or Firm*—Howson and Howson

(57) ABSTRACT

A power plant generates electricity from carbonaceous material and fuel provided by a syngas plant such that clean electric power is generated and flue gas emissions are minimized. The syngas plant produces liquid fuel and unreacted syngas in a Fischer-Tropsch reactor, and the unreacted syngas is conducted to a combustion chamber of the power plant for use as a clean fuel moiety of the carbonaceous material burned in the combustion chamber. The unreacted syngas enables the electric power plant to operate below acceptable environmental limits in producing steam to generate electricity.

1 Claim, 1 Drawing Sheet

INTEGRATED ELECTRIC POWER AND SYNTHETIC FUEL PLANT

CROSS REFERENCE TO RELATED APPLICATION

This application claims the benefit of priority of U.S. Provisional Patent Application No. 60/361,200 filed on Mar. 1, 2002.

FIELD OF THE INVENTION

The present invention relates to clean electric power generation in which toxins in flue gas emissions are minimized for a given power output.

BACKGROUND OF THE INVENTION

It is well known in older electric power plants to burn solid carbonaceous material in the presence of an oxygen-containing gas in a combustion chamber to produce heat which creates steam that is fed to a turbine where it is expanded to produce electricity. The combustion of carbonaceous materials, such as coal, in the production of electricity can cause undesirable air pollution problems because the flue gases may contain toxic heavy metals, such as mercury, along with other undesirable byproducts such as $SO_x$, CO and $NO_x$. To maintain, or improve, air quality, it is important to minimize the production of these undesirable compounds.

Since it is very expensive to remove undesirable compounds from the flue gases of electric power plants, it has been proposed to remove the compounds from the carbonaceous materials prior to combustion.

Fuel gasification provides one known solution for removing undesirable compounds from solid carbonaceous materials. In a conventional coal gasification unit, typically used in a synthetic fuel plant, solid carbonaceous material, or coal, reacts with oxygen to produce a synthetic gas, commonly known as syngas.

One problem with utilizing syngas to generate power is that it is generally not economical to transport syngas over long distances. This has led to proposals for integrated gasification and electric power generation plants where the syngas is converted to electricity on-site.

One known integrated process which attempts to enhance power plant efficiency is described in U.S. Pat. No. 3,986,349 to Egan. In Egan, solid carbonaceous material is first gasified to produce syngas. A portion of this syngas is then contacted with Fischer-Tropsch and hydrogenation catalysts to produce liquid hydrocarbons. The hydrocarbons are utilized as a fuel for a gas turbine to produce supplemental power for peak load demand. Egan further teaches that a portion of the unreacted syngas can be utilized to generate a base-load power output.

Although such an integrated process may help solve the problem of syngas transportation and clean fuel preparation, it is not economical to build an on-site gasification process simply to remove undesirable compounds upstream of combustion because of the large capital and operational expenses involved.

OBJECT OF THE INVENTION

It is an object of this invention to maintain or lower the undesirable components of exhaust gas emissions of an electric power plant by fueling the electric power plant with clean unreacted syngas discharged from a coal gasification unit of an adjacent syngas plant.

SUMMARY OF THE INVENTION

According to the inventive method, electricity is generated from fuel provided by a syngas plant in proximity with an existing electric power plant and by carbonaceous material. The power plant operates within predetermined environmental limits on exhaust gas emissions. The syngas plant is used to produce liquid fuel and unreacted syngas in a Fischer-Tropsch reactor. The unreacted syngas is conducted to the power plant combustion chamber for use as a clean fuel moiety of the carbonaceous material burned in the combustion chamber. The unreacted syngas enables the electric power plant to operate below environmental limits in producing steam to generate electricity.

DETAILED DESCRIPTION OF THE PREFERRED PROCESS

Figure 1:
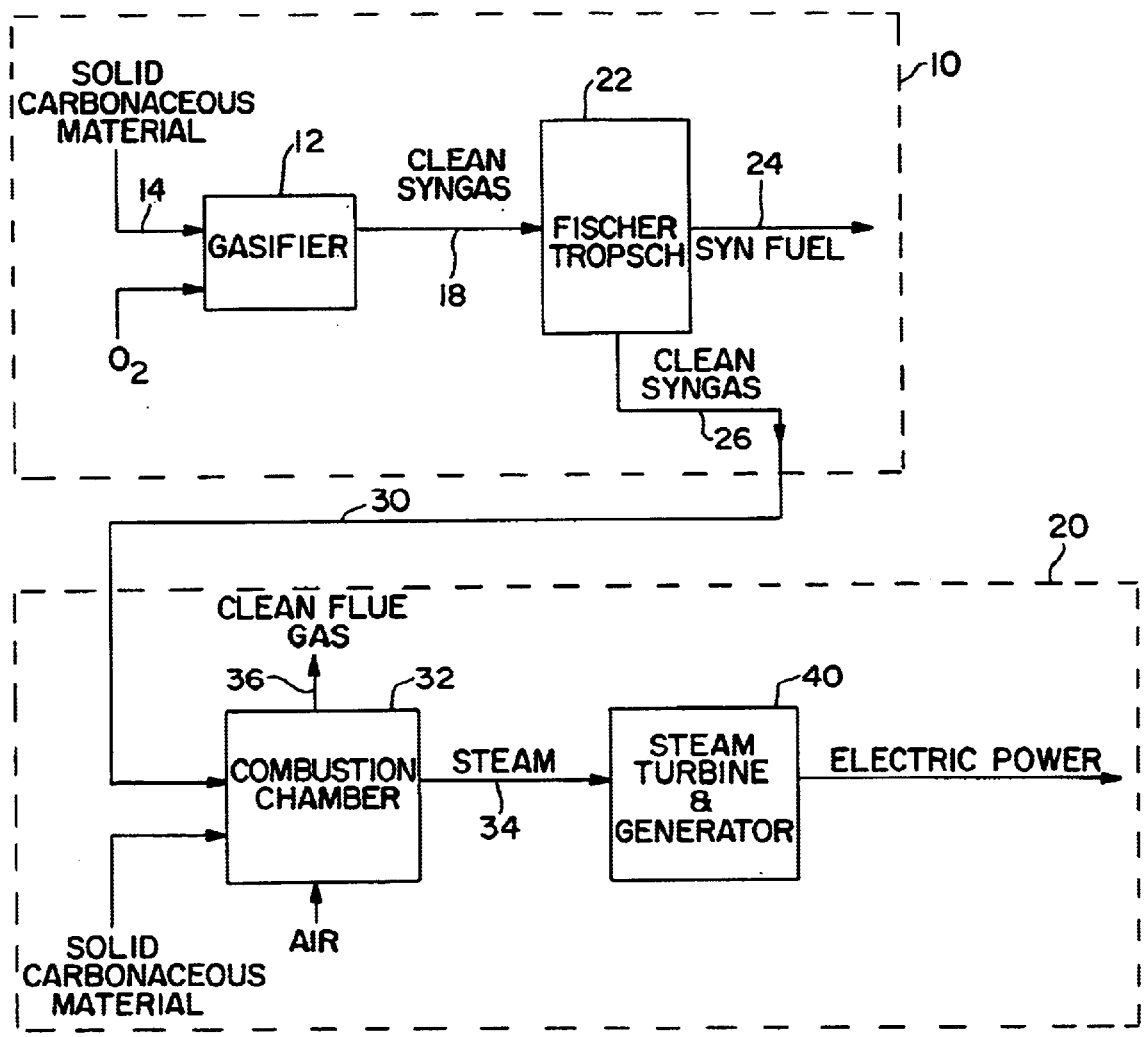
FIG. 1 schematically represents the apparatus of the invention.

FIG. 1 schematically illustrates a synthetic fuel plant 10 connected to an adjacent pre-existing electric power plant 20. The synthetic fuel plant 10 comprises a gasification reactor 12, or gasifier. Solid carbonaceous raw materials are fed through inlet 14 of the gasifier 12. Inside the gasifier 12, the carbonaceous materials are contacted with oxygen and are exothermically reacted under pressure and converted to substantially sulfur and nitrogen-free synthetic gas, or syngas.

The clean syngas is discharged from the gasifier 12 via line 18 and directed into a Fischer-Tropsch reactor 22. In the Fischer-Tropsch reactor 22, the syngas is contacted with a catalyst which synthesizes a portion of the syngas into synthetic liquid fuel, or synfuel. The synfuel is removed from the Fischer-Tropsch unit via line 24. The unreacted syngas is recovered via line 26 and is transported along piping 30.

The unreacted syngas flowing within piping 30 is charged into the combustion chamber 32 of the electric power plant 20 where it is burned to create steam and a clean flue gas. The steam, which exits the combustion chamber via line 34, is used to drive steam turbine 40 to generate electric power. The clean flue gas, which exits the combustion chamber via line 36, does not need added cleanup to meet air pollution standards.

By way of example, assume that a conventional coal fuel power plant is operating just below EPA set limits for discharge of mercury. If the limits for mercury were to be lowered, the plant could comply by reducing power output and hence reducing coal consumption, or, in accordance with the present invention the plant could maintain power output by substituting synfuel for the moiety of coal that would have been displaced.

What is claimed is:

1. A method of generating electricity comprising the steps of:

providing a syngas plant in proximity with an existing electric power plant having a combustion chamber fueled by carbonaceous material with predetermined environmental limits on exhaust gas emissions;

operating the syngas plant to provide liquid fuel and unreacted syngas in a Fischer-Tropsch reactor; and conducting said unreacted syngas to said combustion chamber for use as a clean fuel moiety of the carbonaceous material burned in the combustion chamber to enable the electric power plant to operate below said environmental limits in Producing steam to generate electricity.

* * * * *